United States Patent [19]
Lirov et al.

[11] Patent Number: 5,107,499
[45] Date of Patent: Apr. 21, 1992

[54] ARRANGEMENT FOR AUTOMATED TROUBLESHOOTING USING SELECTIVE ADVICE AND A LEARNING KNOWLEDGE BASE

[75] Inventors: Yuval Lirov, Aberdeen; Swaminathan Ravikumar, Matawan; On-Ching Yue, Middletown, all of N.J.

[73] Assignee: AT&T Bell Laboratories, Murray Hill, N.J.

[21] Appl. No.: 516,411

[22] Filed: Apr. 30, 1990

[51] Int. Cl.$^5$ .............................................. G01R 31/28
[52] U.S. Cl. ..................................... 371/15.1; 395/911
[58] Field of Search ......................... 371/15.1; 364/513

[56] References Cited

U.S. PATENT DOCUMENTS 4,965,741 10/1990 Winchell ............................ 364/513

FOREIGN PATENT DOCUMENTS 0260579 3/1988 European Pat. Off. ............. 395/916

OTHER PUBLICATIONS

Engineering Applications of Artificial Intelligence, vol. 2, No. 1 (Mar. 1989), pp. 3-18, "STAREX-Simultaneous Test and Replace Circuit Pack Troubleshooting Expert System Prototyping and Implementation", Y Lirov, pp. 3-18.

Primary Examiner—Jerry Smith
Assistant Examiner—Henry C. Lebowitz
Attorney, Agent, or Firm—F. B. Luludis

[57] ABSTRACT

Troubleshooting expert systems are generally embodied in software for the purpose of solving difficult problems in some narrow domain of expertise. The prior art describes certain mechanics for developing or generating rules. That process is commonly known as the knowledge acquisition process. Having acquired the knowledge, our new troubleshooting arrangement eliminates the prior art separation between the expert system knowledge acquisition process and the expert system utilization process. Our new arrangement also detects and classifies invalid actions or other errors of the user in a manner that allows for the non-human expert system to advise the human user. Our arrangement interactively communicates between a user and a troubleshooting system, generates a learning knowledge base, identifies an object being tested by the user, utilizes the learning knowledge base for troubleshooting the test object, and classifies the test object as faulty or not faulty. Our arrangement structures prior actions of the user as pairs of elements in a multi-branch tree in the learning knowledge base and the compares present actions of the use with the prior actions of the user. A current signal path is generated between a first input and a first output in the system under test. Then it can be determined whether the test object belongs to the current signal path. Responsive to the comparison of the actions of the user and responsive to whether the test object belongs to the current path, the skill level of the user can be classified into one of a plurality of skill levels. Responsive to the skill level classification of the user, the kind of troubleshooting advice to be given the user can be classified as to one of a plurality of kinds of troubleshooting advice and thereafter the advice can be communicated to the user. Further, the output of the test object can be measured and a new current signal path can be generated and re-generated for identifying a faulty object in the system under test.

12 Claims, 2 Drawing Sheets

ARRANGEMENT FOR AUTOMATED TROUBLESHOOTING USING SELECTIVE ADVICE AND A LEARNING KNOWLEDGE BASE

BACKGROUND OF THE INVENTION

1. Field of the Invention

This invention relates to a computer implemented arrangement, which provides effective troubleshooting including fault diagnosis and which uses a hierarchy of rules with a learning knowledge base.

2. Description of the Prior Art

Expert systems, which are common in the art, are generally embodied in software for the purpose of solving difficult problems in some narrow domain of expertise. Typical examples of expert systems include troubleshooting expert systems, planning or scheduling expert systems and computer aided design expert systems. One example of a troubleshooting expert system is disclosed in the article by Y. Lirov, entitled "STAREX-simultaneous test and replace circuit pack troubleshooting expert system prototyping and implementation", Engineering Applications of Artificial Intelligence, Vol. 2, No. 1 (March 1989), pp. 3-18. That article discloses an expert system for troubleshooting including diagnosing faults in electronic circuit packs. Troubleshooting including diagnosing faults typically involves the existence of an error or a fault in some part or parts of a system and involves the use of some procedure to recognize or verify the fault and to correct the fault.

Troubleshooting expert systems such as the diagnostic expert system disclosed in the patent application of Y. Lirov and O. Yue, entitled "Technique for Producing an Expert System for System Fault Diagnosis", filed Jul. 28, 1989 as Ser. No. 386,325 typically include a plurality of modules like a knowledge based module and a sensor based module. The knowledge base module usually includes a set of rules that define conditions and conclusions, which are followed to solve diagnostic problems, while a typical sensor based module includes a human user, who is equipped with appropriate measurement instruments, called sensors. As an aside and to help understand the concept of rules, the following analog may be considered. The rules in a knowledge base can be compared to a node evaluation function in a typical problem of searching a graph to select the best node for expansion from a current list of candidate nodes whereby the best path to the correct system diagnosis can be found in the shortest amount of time using a minimum of user input. Continuing with our discussion, the rules in the knowledge based module produce directions to a human user in a sensor based module in such a manner that define characteristics such as the "what, when and where" parameters that are to be measured or replaced in the system being troubleshooted. The sensor based module, in turn, communicates the results of the measurements or replacements back to the knowledge base module. In that manner, an interactive selection of the most relevant rules can be accomplished, sometimes through the use of a third module, called an inference engine module. The actual communication in the interaction between the knowledge base module and the sensor based module is usually accomplished through a consultation module. Further details of these and other such modules may be obtained from any standard artificial intelligence textbook. See, for example, P. Winston, "Artificial Intelligence," Academic Press, (New York), 1984.

Unfortunately, it is common that people dislike receiving directions, or advice, for at least three reasons. One reason is that non-human systems tend to be stale unless some process exists to regularly update, replace, change, or alter the knowledge base module of the expert system. In other words it is usually desirable that the non-human system adapt to changes in much the same manner as a human would adapt to change. Another reason is that the time spent by the human in receiving the advice and communicating the results of the measurements back to the knowledge base module may be considered to be unproductive, i.e. may be viewed as wasted time. Still a third reason is that the non-human system may communicate indiscriminate advice instructing the user "what to do" without a satisfactory explanation to the human user as to the reason the user should follow the advice. The reluctance of human users to advice is particularly noticeable when the advice is communicated from a non-human system.

In our view, the above problems arise in the known art because it is an accepted procedure to bifurcate certain processes, e.g. it is common to firstly generate knowledge, or to acquire knowledge, and then to secondly utilize the acquired knowledge in an expert system as two separate and distinct, but repeated, processes. As the underlying process parameters change (e.g., some components in a system may become more likely to fail than others), the expert system may become less efficient and therefore it becomes necessary to repeat the knowledge generation process of the expert system.

SUMMARY OF THE INVENTION

This and other problems are solved in accord with the principles of our invention which includes a method, system and apparatus for troubleshooting an object in a system under test. Our arrangement includes interactively communicating between a user and a troubleshooting system, generating a learning knownledge base, identifying an object being tested by the user, utilizing the learning knowledge base for troubleshooting the test object, and classifying the test object as faulty or not faulty. Also, included in our arrangement is a structuring of prior actions of the user as pairs in a multi-branch tree in the learning knowledge base and the comparing of present actions of the user with the prior actions of the user. A current signal path can be generated between a first input and a first output in the system under test. Then, it can be determined whether the test object belongs to the current signal path. Responsive to the comparison of the actions of the user and responsive to whether the test object belongs to the current path, the skill level of the user can be classified into one of a plurality of skill levels. Responsive to the skill level classification of the user, the kind of troubleshooting advice to be given the user can be classified as to one of a plurality of kinds of troubleshooting advice and thereafter the advice can be communicated to the user. Further, the output of the test object can be measured and a new current signal path can be generated and re-generated for identifying a faulty object in the system under test.

DETAILED DESCRIPTION

The prior art describes certain mechanics for developing or generating rules which can be embodied in a knowledge base module of a troubleshooting expert system. That process is commonly known as the knowledge acquisition process in the artificial intelligence art. Having acquired the knowledge, or having generated the rules, we propose a new troubleshooting arrangement using expert systems, which arrangement eliminates the prior art separation between the expert system knowledge acquisition process and the expert system utilization process. Furthermore, our new arrangement advantageously detects and classifies invalid actions or other errors of the user in a manner that allows for the non-human expert system to advise, or coach, or tutor, the human user.

Figure 1:
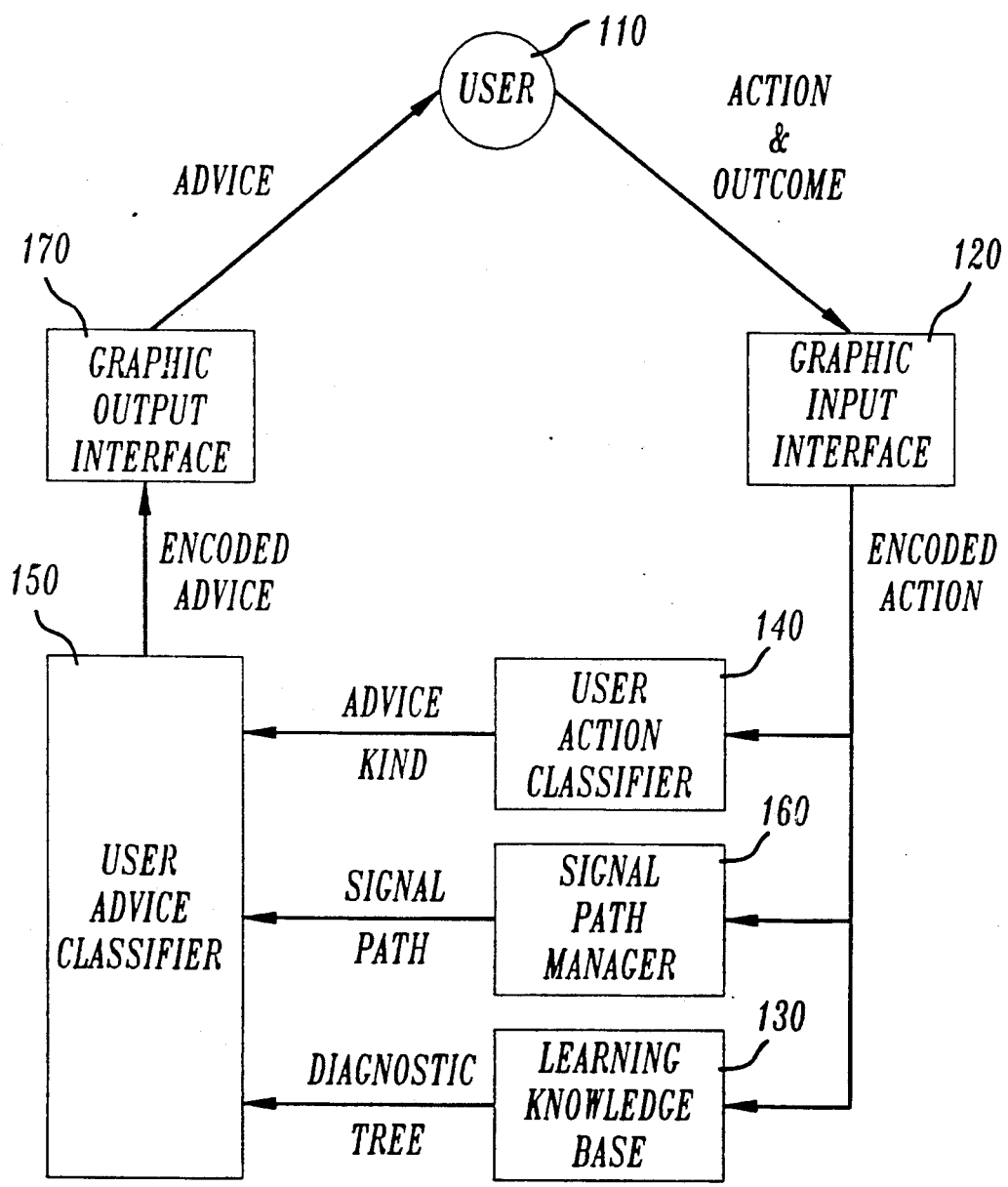
FIG. 1 illustrates in flow chart form the components which implement the principles of the invention.

FIG. 1 illustrates the overall information flow using our new arrangement, which includes a method, a system and apparatus and which is based upon six components and which may be suitably embodied in software. We will now briefly describe each of the six components and follow the brief description with a more detailed description of each of the six components as an aid in understanding the principles of our invention.

The first component is a graphic input interface 120, which allows a user 110 to communicate specific measurements or replacement actions to the troubleshooting expert system.

The second component is a learning knowledge base 130 in which is stored any valid action of the user 110. Knowledge base 130 may be embodied as an adjustable weighted multi-branch tree where each of the nodes of the tree corresponds to a condition of a rule and where each of the arcs of the tree corresponds to a conclusion of a rule.

The third component is an user action classifier 140, which may be embodied in a software table. Action classifier 140 allows the expert system to infer and classify any of a plurality of degrees of user troubleshooting expertise by comparing present actions of user 110 as obtained by interface 120 versus prior actions of user 110. The prior actions of user 110 are structured in the multi-branch tree of knowledge base 130. In one illustrative embodiment, action classifier 140 may allow the expertise of user 110 to be classified as one of three levels of troubleshooting skill, for example, (a) as a beginner troubleshooter, or (b) as a good troubleshooter, or (c) as an expert troubleshooter.

The fourth component is an user advice classifier 150, which may also be embodied in a software table. Advice classifier 150 allows the expert system to infer and classify any of a plurality of appropriate kinds of advice responsive to the skill level of user troubleshooting expertise as provided by user action classifier 140. In one illustrative embodiment, advice classifier 150 may allow the advice to user 110 to be classified, for example, (a) as troubleshooting strategy advice or (b) as circuit pack schematic advice.

The fifth component is signal path manager 160, which may also be embodied in software as a set of rules. Signal path manager 160 recursively generates and re-generates signal paths (signal path is a term which we will define later) to locate a faulty object.

The sixth component is graphic output interface 170 for communicating the specific advice to user 110.

Now we turn to a more detailed description of each of the six components.

The first component, graphic input interface 120, could be embodied (a) as a digitizer, or (b) as a cathode ray tube device with a light pen or other computer input device, or, for that matter, (c) as any device that would permit user 110 to identify objects, which are being measured by user 110, and to communicate the identity of the object to the troubleshooting expert system.

The second component, learning knowledge base 130, could be embodied as a two-tuple pair of elements, also referred to herein as a pair, including (a) a weight element, which reflects some weight or measure of significance to be given the pair, for example, the frequency of measuring an object, and (b) a recursive data structure element, for example, a tree element. Consider the pair of elements depicted as the two-tuple (weight, tree) where the tree element is defined using the following recursive symbology:

$$\text{tree (object, advice, if-fail (list of pairs), if-pass (list of pairs))} \quad (1)$$

The symbology used in equation (1) is a short hand notation for a recursive data structure that includes four data fields, which we now describe.

The first data field, called the object field, includes an encoded identification of the object being measured by user 110. For example, assume that the object being measured is an intergrated circuit. It may be desirable to measure specific components or other parts of the intergrated circuit, which themselves would be objects for the purposes of illustrating the principles of our invention. With that background, the object field in equation (1) could be encoded to, for example, identify a specific pin on a specific intergrated circuit, which itself could be a component of a circuit pack.

The second data field, called the advice field, includes an encoded statement of advice to be communicated to user 110. As one example, the statement of advice could recommend a procedure, which is to be followed so as to measure the object identified in the object field. As another example, the advice field could be a statement to the effect that the object should be tested with a voltmeter for some period of time and that the results of the voltmeter test should be stored for subsequent processing. The advice field can be formulated in any of a number of ways. One way to formulate the advice field is to define it in such a manner that it expects a binary result relative to the statement of advice. In that manner, the outcome of the test that is recommended in the advice field can be characterized as either having failed (in which case our method either uses a pair of elements from the list of pairs in the third data field or creates a new pair for insertion in the third data field) or being passed (in which case our method either uses a pair from the list of pair in the fourth data field or creates a new pair for insertion in the fourth field). This leads to a more detailed description of the last two fields in equation (1).

The third data field, called the if-fail (list of pairs) field, includes a list of empty or one or more pairs, each of which includes both a weight element and a tree element, the latter also defined using equation (1).

The fourth data field, called the if-pass (list of pairs) field, includes, like the third data field, a list of empty or one or more pairs, which include both a weight element and a tree element, also defined pursuant to equation (1).

As an aside, if both the third and fourth data fields include an empty list of pairs, there is no further recursion beyond the object identified in the first data field of that tree element. Such a tree with an empty list of successor pairs is also called a leaf in the artificial intelligence art. An empty list of pairs is simply a set of pairs which has no elements.

We now turn to a more specific description of the contents of the third and fourth data fields and of the meaning of the phrase list of pairs.

Each list of pairs in the third and fourth data fields is a rank ordering of one or more pairs where the rank ordering is in one-to-one correspondence with the relative magnitude of the weight element of a pair. Also, the next object to be measured will be that object encoded in the object field of the tree element in the first pair in the list of pairs. That result occurs in view of the rank ordering of pairs in each list of pairs. That is, the first pair in a list of pairs will have a weight element, which is generally larger and in any case is not less than the weight element of any other pair in the list of pairs.

Either the third field or the fourth field of a tree element is selected in response to the binary result obtained from applying the advice stated in the second field on the object stated in the first field of the tree element of a two-tuple pair of elements. That is, the third field is selected if the advice, when applied, fails, while the fourth field is selected if the advice, when applied, passes.

The third component, user action classifier 140, could be embodied as a set of rules that characterize or classify the skill, or the skill level, of user 110 as one skill level out of a plurality of possible troubleshooting skill levels. For example, the rules could be established in a manner that classify the user's skill (a) as a beginner troubleshooter, or (b) as a good troubleshooter, or (c) as an expert troubleshooter. With such a three skill level assumption and with the added assumption that the troubleshooting expert system includes a first memory that maintains the identification of a current list of pairs of the type included in learning knowledge base 130, the following set of rules can be embodied in user action classifier 140:

Rule 140-1: If the test object selected by user 110 is the same object as the object identified in the first data field of the tree element of one of the pairs in the current list of pairs, hereinafter that one pair is called the present pair, then the weight element of the present pair is incremented, in our illustrative embodiment, by a numerical value of one. The current list of pairs with the incremented present pair is then sorted, which, because of the rank ordering by weight, may result in the present pair being relocated to a different relative position within the current list of pairs. In addition, (a) the skill of user 110 is classified as a good troubleshooter, and (b) the present pair from the current list of pairs is moved, through use of its identification in the first memory of the troubleshooting expert system, to a second memory of the troubleshooting expert system and becomes known as the previous pair, i.e. the previous pair is stored in the second memory, and (c) a new list of pairs is selected and the identification of the new list replaces the identification of the current list of pairs in the first memory of the troubleshooting expert system, and (d) the new list of pairs replaces the current list of pairs as the new current list of pairs.

Ripe for discussion at this juncture is the process by which the new list of pairs is selected. As previously described, the third data field and the fourth data field of a tree element includes a list of pairs. As also previously described, the third data field is selected upon detecting of a failure of the advice offered in the advice field and the fourth data field is selected upon detecting of a passing of the advice offered in the advice field of the tree element in the present pair. Accordingly, in response to the binary outcome of the test either having failed or being passed, respectively, a new list of pairs is selected.

Rule 140-2: If the test object selected by user 110 is not the same object as the object identified in the first data field of a tree element of any of the pairs in the current list of pairs, then the skill level of user 110 is classified as not a good troubleshooter. Not a good troubleshooter in our illustrative embodiment means that the skill level of user 110 is either that of a beginner troubleshooter or that of an expert troubleshooter.

As an aside, it can be mentioned that, in view of Rule 140-2 above, the troubleshooting expert system begins to adapt its learning knowledge base 130. That is, the non-human troubleshooting expert system adapts to changes in much the same manner as a human would adapt to change.

Continuing, in response to the "If" condition of Rule 140-2, user action classifier 140 can be suitably programmed to perform the following methodology, which includes generating a new two-tuple pair with a weight element set to a numerical value of one and with a tree element generated in a manner which we will describe in the next paragraph. Upon generating the new pair, the present pair is moved to the second memory of the troubleshooting expert system and becomes known as the previous pair while the newly created, or generated, pair is inserted in its rank ordered location in the current list of pairs, which is identified in the first memory of the troubleshooting expert system, and becomes known as the present pair. In that manner the troubleshooting expert system adapts its learning knowledge base 130. Noteworthy, the system adapts concurrently with the use of the system, and not, as in the prior art, as separate and distinct processes.

We now describe a methodology for generating the tree element of the newly generated pair.

The first data, or object, field of the tree is set to an encoded identification of the object selected by user 110.

The second data, or advice, field of the tree, which is an encoded statement of procedure that is recommended to be followed when measuring the object identified in the object field, is generated in response to an interaction between user 110 and the troubleshooting expert system by way of which user 110 specifies the procedure to measure the object selected by user 110.

The third data, or if-fail, field as well as the fourth data, or if-pass, field are encoded to include empty lists of two-tuple pairs. Inasmuch as both the third and the fourth data fields of the newly generated tree element include empty lists of pairs, that tree is called a leaf.

Figure 2:
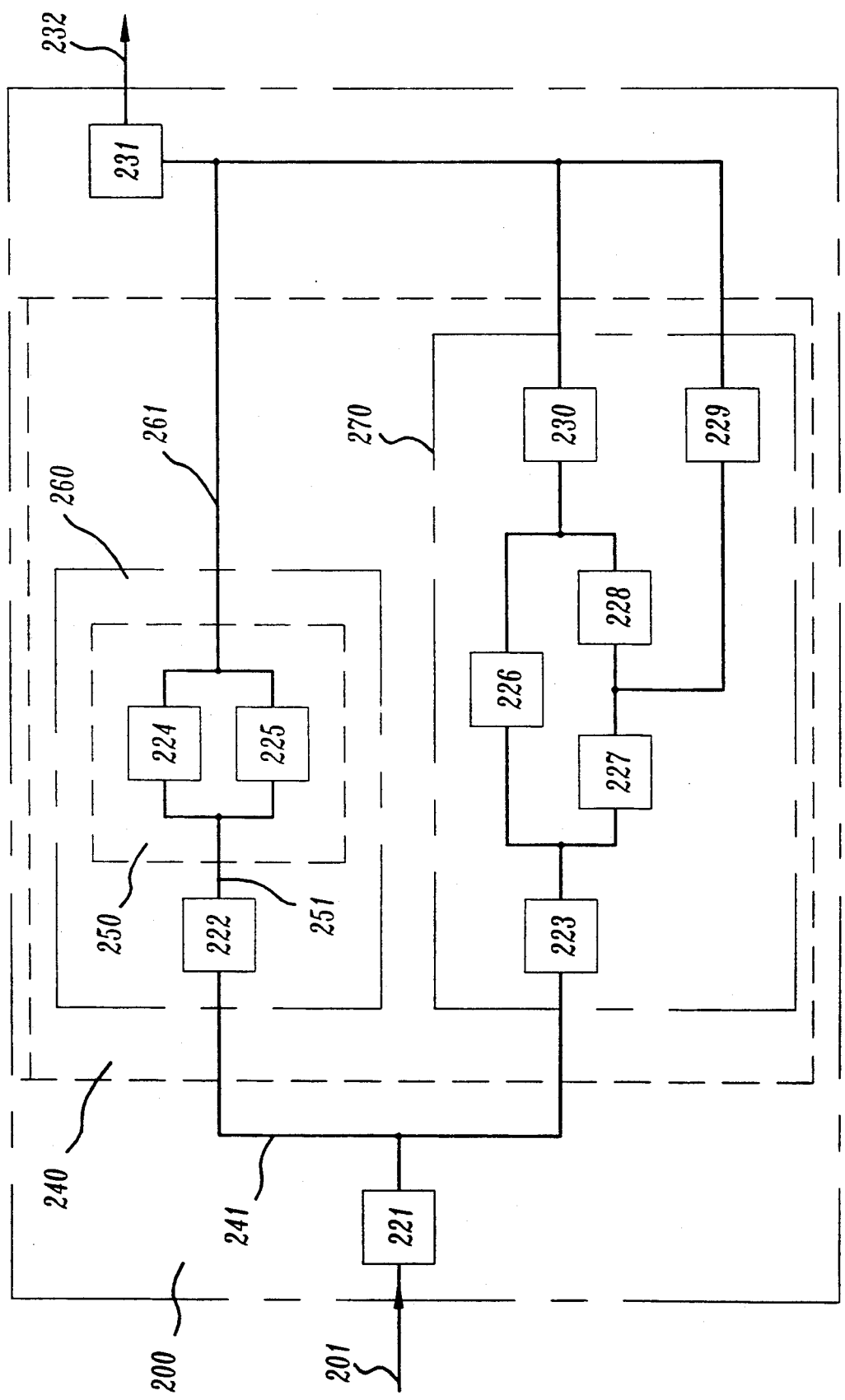
FIG. 2 illustrates a generic unit and is useful in understanding the way in which the principles of the invention may be practiced to troubleshoot a fault in the illustrated generic unit.

We now turn to FIG. 2 as an aid in defining a concept called signal path, which will be used in a further description of user action classifier 140, user advice classifier 150, and signal path manager 160.

FIG. 2 illustrates a unit 200, which is a generic object, that includes a plurality of objects like objects 221, 224, 229 among others, which are interconnected in some predefined order to provide some function. For purposes of a description of an illustrative embodiment of the principles of our invention, the particular function is not important and therefore its description is omitted. We assume that a user like user 110 desires to troubleshoot unit 200 and does so in accord with a certain set of rules. Each object as well as the unit itself has an input and an output. For example, input 201 and output 232 are the input and output respectively of unit 200. Input 201 is also the input to object 221 while output 232 is also the output of object 231. Using that background, we now define the concept of a signal path. A signal path is an ordered set of objects from a specific input to a specific output. For example, the signal path from input 241 to output 261 of object 260 includes object 222 with its output 251, which is also the input 251 to object 250. The output 261 of object 250 is also the output 261 of object 260. Object 250 has a signal path from its input 251 to its output 261 through both of objects 224 and 225.

Now the concept of a signal path can be further discussed in terms of a downstream signal path and an upstream signal path.

As mentioned, a signal path is an ordered set of objects from a specific input to a specific output. On the one hand, for a first signal path having an object in the first signal path, the term downstream signal path means a second signal path consisting of that part of the first signal path, which extends from the output of the object in question and continues to the output of the first signal path. On the other hand, for a first signal path having an object in the first signal path, the term upstream signal path means a second signal path consisting of that part of the first signal path, which extends from the input of the first signal path and continues to the input of the object in question. Note that the object in question is itself excluded from the downstream signal path and is also excluded from the upstream signal path. For example, consider a signal path defined from input 241 through objects 260 and 231 to output 232. Now consider object 250. Relative to object 250, the downstream signal path includes object 231 while the upstream signal path includes object 222. As another example, consider a signal path defined from input 201 through object 200 to output 232. Again consider object 250. Relative to object 250, the downstream signal path includes object 231 as before; however, the upstream signal path includes objects 221 and 222. Note that object 270 as well as the plurality of objects illustrated in object 270 are excluded from both the downstream and upstream signal paths when defined relative to object 250 even though object 270 as well as objects 223, 226, 227, 228, 229 and 230 within object 270 are in the signal path from input 201 through object 200 to output 232.

Now the concept of a signal path can be further discussed in terms of a current signal path.

Consider any signal path with the property that its input is found to be correct while its output is found to be in fault. We can conclude that there is some malfunction in the signal path. The term current signal path means a signal path in which a fault is detected. An encoded identity of the current signal path is stored in a third memory of the troubleshooting expert system.

It is now convenient to offer a further definition of troubleshooting. Troubleshooting can be viewed as the process of identifying a current signal path. With knowledge of the current signal path, it becomes the further task of the troubleshooter to locate the faulty object(s) within the current signal path. The troubleshooter can select an object in the current signal path, measure the output of the selected object, and determine whether or not the output is in fault. On the one hand, if the output is faulty, then either the selected object is at fault or an object in an upstream signal path is at fault. On the other hand, if the output of the selected object is not at fault, then an object in the downstream signal path is at fault.

We now return to user action classifier 140 to complete its description. One further rule is embodied in action classifier 140:

Rule 140-3: If the test object selected by user 110 does not belong to the current signal path, then the skill level of user 110 is characterized as that of a beginner troubleshooter.

The object field and the advice field of the tree element in one of the pairs in the current list of pairs is used: (a) for aiding user 110 in selecting the object to be tested from the current signal path, and (b) for comparing the object selected by user 110 with the object identified in the object field of the tree element in the first two-tuple pair in the current list of pairs, and (c) for inferring and classifying the action of user 110 in response to the comparison results. For example, the user's actions may be classified according to whether user 110 (i) is or is not using a correct strategy and/or (ii) understands or does not understand the casual dependency between the objects in the current signal path.

That completes our description of user action classifier 140.

The fourth component, user advice classifier 150, could be embodied in software as a set of three rules allowing the troubleshooting expert system to infer and classify the appropriate kind of advice, which ought to be given user 110, in response to the skill level of user 110.

Rule 150-1: If the skill level of user 110 is that of a beginner troubleshooter, then it could be concluded that user 110 needs advice that relates to troubleshooting strategy and, accordingly, advice classifier 150 could so set a flag for later use in signalling the need for that strategy to signal path manager 160.

Rule 150-2: If the skill level of user 110 is that of a beginner troubleshooter or an expert troubleshooter, then it could be concluded that user 110 needs advice that relates to the current signal path and, accordingly, advice classifier 150 could so set a flag for later use in signalling the need for that strategy to signal path manager 160.

Rule 150-3: If the skill level of user 110 is that of a good troubleshooter, then it would be concluded that user 110 does not need advice and, accordingly, advice classifier 150 could so set a flag for later use in signalling the need for that strategy to signal path manager 160.

That completes our description of user advice classifier 150.

The fifth component, signal path manager 160, could be embodied in software as a set of two rules allowing the expert system to recursively generate and re-generate the current signal path for the purpose of seeking out the object in the current signal path, which is at fault.

Rule 160-1: If the output of the object selected by user 110 is not at fault, then a new current signal path is generated by the process of (a) retrieving the current signal path from the third memory of the troubleshooting expert system; (b) generating an upstream signal path responsive to the selected object and responsive to the current signal path; (c) deleting, or erasing, or removing the selected object and all objects of the upstream signal path from the current signal path to obtain a new current signal path; and (d) storing the new current signal path in the third memory.

Rule 160-2: If the output of the object selected by user 110 is at fault, then a new current signal path is generated by the process of (a) retrieving the current signal path from the third memory of the troubleshooting expert system; (b) generating a downstream signal path responsive to the selected object and responsive to the current signal path; (c) deleting, or erasing, or removing the selected all objects of the downstream signal path from the current signal path to obtain a new current signal path; and (d) storing the new current signal path in the third memory.

That completes our description of signal path manager 160.

The sixth component, graphic output interface 170, could be embodied through a set of two rules allowing the expert system to communicate the appropriate advice to user 110 responsive to the kind of advice identified by the flag set by user advice classifier 150 and responsive to the current list of pairs of the type included in learning knowledge base 130 and responsive to the current signal path.

Rule 170-1: If the flag set by user advice classifier 150 is set to indicate that user 110 needs advice that relates to the current signal path, then communicate the current signal path to user 110.

Rule 170-2: If the flag set by user advice classifier 150 is set to indicate that user 110 needs advice that relates to troubleshooting strategy, then communicate the object field and the advise field from the tree element of the first two-tuple pair in the current list of pairs to user 110.

Note that the first two-tuple pair includes the tree element with the weight element having the greatest value among the current list of pairs and, according to Rule 140-1, that is the tree which will be used most often and therefore is in a sense the best troubleshooting advice.

Note also that pursuant to Rules 170-1 and 170-2, the only advice communicated to user 110 is advice, which is relevant to the kind of troubleshooting error actually detected by user action classifier 140. Moreover, as user 110 is not required to follow the advice at each and every step of the troubleshooting process, there is less time wasted by the consultation module, i.e. unproductive time is remarkably decreased.

Although our invention has been described and illustrated in detail, it is to be understood that the same is not by way of limitation. Hence, the spirit and scope of our invention is limited only by the terms of the appended claims.

We claim:

1. A method for troubleshooting an object in a system under test, said method being performed by an electronic computer and includes the steps of interactively communicating between a user and a troubleshooting system, generating a learning knowledge base, identifying an object being tested by the user, utilizing the learning knowledge base for troubleshooting the test object, and classifying the test object as faulty or not faulty wherein the improvement comprises the steps of:
   (a) structuring prior actions of the user as pairs of elements in a multi-branch tree in the learning knowledge base;
   (b) responsive to selected pairs of elements, comparing present actions of the user with the prior actions of the user;
   (c) generating a current signal path between a first input and a first output in the system under test;
   (d) determining whether the test object belongs to the current signal path;
   (e) responsive to the comparison of the actions of the user and responsive to whether the test object belongs to the current path, classifying the skill level of the user into one of a plurality of skill levels;
   (f) responsive to the skill level classification of the user, classifying the kind of troubleshooting advice to be given the user as to one of a plurality of kinds of troubleshooting advice; and
   (g) communicating the classified troubleshooting advice to the user.

2. The method defined in claim 1 further comprising the steps of:
   (h) measuring the output of the test object and
   (i) responsive to the output of the test object, generating a new current signal path.

3. The method defined in claim 2 further comprising the steps of:
   (j) responsive to the output of the test object evidencing a fault in the test object, generating a downstream signal path as the new current signal path.

4. The method defined in claim 2 further comprising the steps of:
   (j) responsive to the output of the test object evidencing no fault in the test object, generating an upstream signal path as the new current signal path.

5. A system for troubleshooting an object under test, the system including an electronic computer, the electronic computer including means for interactively communicating between a user and a troubleshooting system, means for generating a learning knowledge base, means for identifying an object being tested by the user, means for utilizing the learning knowledge base for troubleshooting the test object, and means for classifying the test object as faulty or not faulty wherein the improvement comprises:
   means for structuring prior actions of the user as pairs in a multi-branch tree in the learning knowledge base;
   means, responsive to selected pairs of elements, for comparing present actions of the user with the prior actions of the user;
   means for generating a current signal path between a first input and a first output in the system under test;
   means for determining whether the test object belongs to the current signal path;
   means responsive to the comparison of the actions of the user and responsive to whether the test object belongs to the current path for classifying the skill level of the user into one of a plurality of skill levels;
   means responsive to the skill level classification of the user for classifying the kind of troubleshooting advice to be given the user as to one of a plurality of kinds of troubleshooting advice; and means for communicating the classified troubleshooting advice to the user.

6. The system defined in claim 5 further comprising:
means for measuring the output of the test object and
means responsive to the output of the test object for generating a new current signal path.

7. The system defined in claim 6 further comprising:
means responsive to the output of the test object evidencing a fault in the test object for generating a downstream signal path as the new current signal path.

8. The system defined in claim 6 further comprising:
means responsive to the output of the test object evidencing no fault in the test object for generating an upstream signal path as the new current signal path.

9. Apparatus for troubleshooting an object in a system under test, the apparatus including an electronic computer, the electronic computer including means for interactively communicating between a user and a troubleshooting system, means for generating a learning knowledge base, means for identifying an object being tested by the user, means for utilizing the learning knowledge base for troubleshooting the test object, and means for classifying the test object as faulty or not faulty wherein the improvement comprises:
  means for structuring prior actions of the user as pairs in a multi-branch tree in the learning knowledge base;
  means, responsive to selected pairs of elements, for comparing present actions of the user with the prior actions of the user;
  means for generating a current signal path between a first input and a first output in the system under test;
  means for determining whether the test object belongs to the current signal path;
  means responsive to the comparison of the actions of the user and responsive to whether the test object belongs to the current path for classifying the skill level of the user into one of a plurality of skill levels;
  means responsive to the skill level classification of the user for classifying the kind of troubleshooting advice to be given the user as to one of a plurality of kinds of troubleshooting advice; and
  means for communicating the classified troubleshooting advice to the user.

10. The apparatus defined in claim 9 further comprising:
means for measuring the output of the test object and
means responsive to the output of the test object for generating a new current signal path.

11. The system defined in claim 10 further comprising:
means responsive to the output of the test object evidencing a fault in the test object for generating a downstream signal path as the new current signal path.

12. The system defined in claim 10 further comprising:
means responsive to the output of the test object evidencing no fault in the test object for generating an upstream signal path as the new current signal path.

* * * * *